United States Patent
El Metennani et al.

(10) Patent No.: US 11,396,977 B2
(45) Date of Patent: Jul. 26, 2022

(54) AXLE ASSEMBLY DRAIN PLUG GUARD FOR LANDFILL COMPACTOR

(71) Applicant: Caterpillar Inc., Peoria, IL (US)

(72) Inventors: Elias El Metennani, Oak Park, IL (US); Amit Kashyap, Elgin, IL (US); Joseph Frystak, Aurora, IL (US); Dan Pierce, Deadwood, SD (US)

(73) Assignee: Caterpillar Inc., Peoria, IL (US)

( * ) Notice: Subject to any disclaimer, the term of this patent is extended or adjusted under 35 U.S.C. 154(b) by 107 days.

(21) Appl. No.: 16/716,762

(22) Filed: Dec. 17, 2019

(65) Prior Publication Data

US 2021/0180750 A1 Jun. 17, 2021

(51) Int. Cl.
| | |
|---|---|
| *F16N 31/00* | (2006.01) |
| *B60B 35/16* | (2006.01) |
| *E02D 3/026* | (2006.01) |
| *F16H 57/04* | (2010.01) |
| *F16H 57/02* | (2012.01) |

(52) U.S. Cl.
CPC .............. *F16N 31/00* (2013.01); *B60B 35/16* (2013.01); *E02D 3/026* (2013.01); *F16H 57/02* (2013.01); *F16H 57/0408* (2013.01); *F16N 2031/008* (2013.01)

(58) Field of Classification Search
CPC ... F16N 31/00; F16N 2031/008; E02D 3/026; B60B 35/16; B60B 35/166; B60B 35/122; B60B 35/14; B60B 35/163; F16H 57/02; F16H 57/0408; F16H 57/031; F16H 57/032; F16H 57/408
See application file for complete search history.

(56) References Cited

U.S. PATENT DOCUMENTS

| | | | | |
|---|---|---|---|---|
| 4,310,200 A | * | 1/1982 | Olender | B60B 35/166 301/129 |
| 4,655,307 A | * | 4/1987 | Lamoureux | B62D 25/2072 180/69.1 |
| 5,145,191 A | * | 9/1992 | Stewart | F16J 3/043 277/636 |
| 5,839,531 A | * | 11/1998 | McGee | F16N 31/006 180/69.1 |
| 7,055,895 B1 | * | 6/2006 | King | B62D 25/2072 296/180.1 |
| 9,920,827 B1 | * | 3/2018 | Sieferd | F16H 57/037 |
| 10,682,884 B1 | * | 6/2020 | Pierce | B60B 35/122 |

(Continued)

FOREIGN PATENT DOCUMENTS

| | | |
|---|---|---|
| CN | 207345390 U | 9/2017 |
| EP | 2581240 A1 * | 4/2013 |
| WO | WO 2018161117 A1 * | 9/2018 ............... B60G 9/00 |

OTHER PUBLICATIONS

836G CAT Landfill Compactor, 2003. (Year: 2003).*

(Continued)

*Primary Examiner* — Vinh Luong
(74) *Attorney, Agent, or Firm* — von Briesen & Roper, s.c.

(57) ABSTRACT

An axle assembly for a landfill compactor includes an axle housing, a carrier housing located proximate the center of the axle housing, a drain plug located on an underside of the carrier housing, and a guard. The guard is attached to the underside of the carrier housing with adhesive such that the guard covers the drain plug and is configured to protect and give access to the drain.

14 Claims, 5 Drawing Sheets

(56) References Cited

U.S. PATENT DOCUMENTS

| 11,273,671 | B2* | 3/2022 | Pierce | B60B 35/166 |
|---|---|---|---|---|
| 2006/0152070 | A1* | 7/2006 | Doud | B60B 35/003 |
| | | | | 301/137 |
| 2011/0079978 | A1 | 4/2011 | Schreiner et al. | |
| 2016/0046150 | A1* | 2/2016 | Kelly | B60B 35/163 |
| | | | | 156/60 |
| 2021/0023879 | A1* | 1/2021 | Pierce | B60B 35/166 |

OTHER PUBLICATIONS

Define underside, Google Search, Jun. 1, 2021 (Year: 2021).*
Adhesive Bonding or Welding? The Answer May Surprise You, David Duchesne, Jul. 10, 2019 (Year: 2019).*
Is welding a form of gluing? Google Search, Dec. 3, 2021 (Year: 2021).*
Synonyms for welding, Google Search, Dec. 3, 2021 (Year: 2021).*

* cited by examiner

AXLE ASSEMBLY DRAIN PLUG GUARD FOR LANDFILL COMPACTOR

TECHNICAL FIELD

The present disclosure relates generally to landfill compactors and more specifically to axle assemblies for landfill compactors.

BACKGROUND

Landfills include vast quantities of trash and refuse of varied shape, size, weight, and texture. Because the surface area of a landfill is limited, it is beneficial to evenly distribute the refuse to take maximum advantage of the available space. Loose landfill refuse may occupy more than twenty times the volume of compacted waste. Therefore, it is beneficial to break down the refuse into smaller pieces to both facilitate this space usage and lessen the time required for disintegration, biodegradation, dissolution, etc.

Landfill compactors are used to move the refuse around the landfill for processing, to evenly distribute the refuse across the landfill prior to being covered with soil and to compact the refuse to increase the density. In order to do so, a typical landfill compactor includes four or more large metal wheels from which protrude a plurality of metal teeth. Such wheels are designed to not only dig deeply into the refuse and provide the traction necessary to navigate, but also chop or otherwise break down the refuse as they rotate.

The terrain encountered at a landfill by a landfill compactor is often unpredictable and rough. As the landfill compactor travels across this uneven terrain, the underside of the compactor can experience significant wear from contact with the refuse. This can expose vulnerable components and lead to premature failure of critical parts. In particular, drain plugs located on the underside of axle assemblies are susceptible to failure as a result of this type of wear.

The prior art has failed to adequately address this issue. U.S. patent application Ser. No. 12/888,145 to Springer discloses an axle guard assembly for inhibiting the intrusion of wire wrap into and around components present at a joint between an axle and a wheel of a compaction machine. However, this guard prevents "wire-wrap" in which elongated pieces of refuse such as wires, cables or strips of fabric become wrapped around the axle. The guard of Springer does not prevent wear on the underside of the axle housing caused by contact with other shapes of refuse. Therefore, Springer does not solve the problem.

The present disclosure relates to a guard attached with adhesive to the underside of the axle housing of a landfill compactor.

SUMMARY OF THE DISCLOSURE

According to one aspect of the disclosure, an axle assembly for a landfill compactor is disclosed. The axle assembly may include an axle housing, a carrier housing located in the center of the axle housing, a drain plug located on an underside of the carrier housing, and a guard attached to the underside of the carrier housing with adhesive such that the guard covers the drain plug, the guard being configured to protect and give access to the drain.

According to another aspect of the disclosure, a landfill compactor is disclosed. The landfill compactor may include a frame, an engine mounted to the frame, and an axle assembly supporting the frame. The axle assembly may include an axle housing, a carrier housing located in the center of the axle housing, a drain plug located on an underside of the carrier housing, and a guard attached to the underside of the carrier housing with adhesive such that the guard covers the drain plug, the guard being configured to protect and give access to the drain.

According to yet another aspect of the disclosure, a method for protecting an axle housing drain plug on a landfill compactor is disclosed. The method may include the following steps: providing an axle assembly, the axle assembly including an axle housing, a carrier housing located in the center of the axle housing, and a drain plug located on an underside of the carrier housing; providing a guard, the guard having an upper side configured to protect and give access to the drain plug; and attaching the guard to the underside of the carrier housing with adhesive such that the guard protects the drain plug.

These and other aspects and features of the present disclosure will be more readily understood after reading the following detailed description in conjunction with the accompanying drawings.

DETAILED DESCRIPTION

Figure 1:
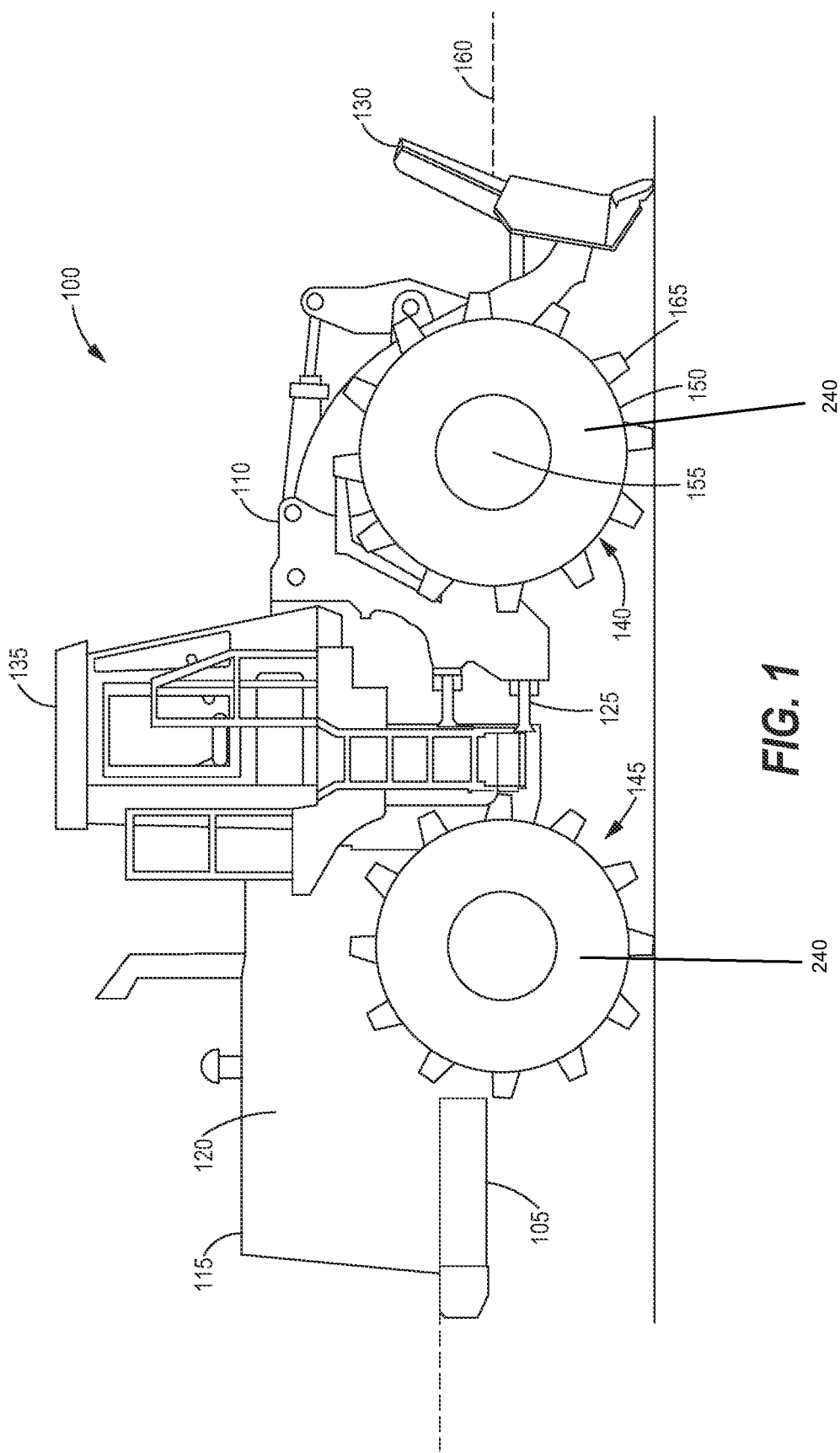
FIG. 1 is a side diagram of a landfill compactor according to one embodiment of the present disclosure.

Referring now to the drawings, and with specific reference to FIG. 1, a landfill compactor constructed in accordance with the present disclosure is shown referred to by reference number 100. A landfill compactor may be used to move and compact waste, trash, refuse, or refuse (not shown) in a landfill to increase the density of the refuse. It does so by cutting refuse into smaller pieces and compacting the pieces so that a greater quantity of refuse may be disposed of in the space available.

The landfill compactor 100 includes a frame 105 with a front portion 110 and a rear portion 115. An engine 120 is mounted on the rear portion 115. The front portion 110 and rear portion 115 of the frame 105 may be fixedly connected or flexibly connected by an articulation joint 125 which enables easier movement over uneven terrain. A blade or bucket 130 may be attached to the front 110 end to move refuse. Other work implements may also be possible. The landfill compactor 100 further includes an operator cab 135 from which an operator may control the compactor.

The frame 105 is supported by a front axle assembly 140 and a rear axle assembly 145. Other than their location, the axle assemblies 140, 145 are similar in construction. Each axle assembly 140, 145 extends laterally from one side of the landfill compactor 100 to the other with a wheel 150 mounted on each end. Each wheel 150 is mounted to its respective axle assembly 140, 145 for rotation about an axis 155 which extends along the axle assembly 140, 145 and is generally perpendicular to a longitudinal axis 160 of the landfill compactor 100. The axle assemblies 140, 145 attach the wheels 150 to the frame 105, allow the wheels 150 to rotate, and transfer power from the engine 120 to the wheels 150 to enable the landfill compactor 100 to move across the surface of the landfill. Each wheel 150 includes a plurality of metal teeth 165 positioned on an outer surface of the wheel. The teeth 165 of each wheel 150 are arranged around the outer surface of the wheel 150 in a known manner to most effectively tear, cut, and provide compacting force to the refuse beneath each wheel 150.

Figure 2:
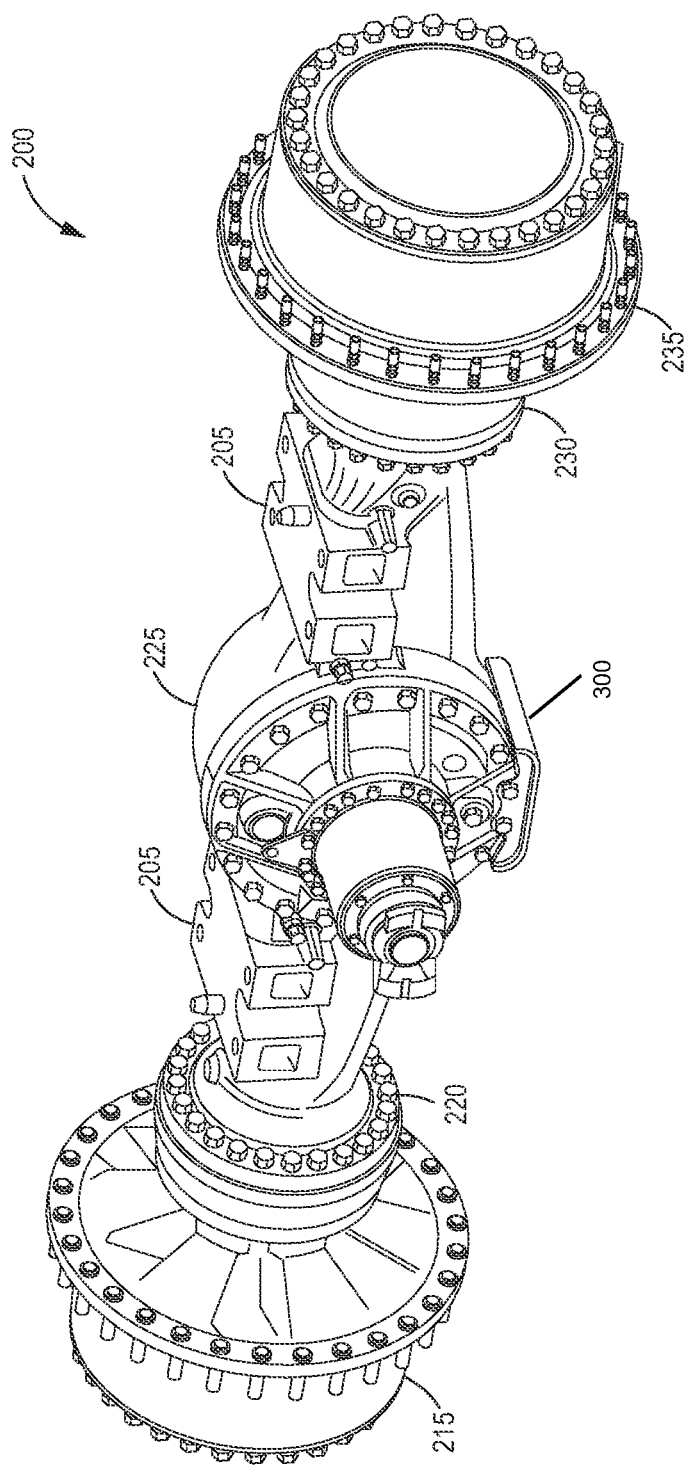
FIG. 2 is perspective view of an axle assembly for a landfill compactor similar to FIG. 1. according to one embodiment of the present disclosure.

FIG. 2 depicts an exemplary embodiment of the front axle assembly 200 of a typical landfill compactor 100. The rear axle assembly 145 can be assumed to be substantially the same as the front axle assembly 140, only reversed such that elements towards the front of the landfill compactor 100 on the front axle are towards the rear of the landfill compactor 100 on the rear axle. The axle assembly 200 is mounted to the frame 105 via axle assembly mounts 205. The axle assembly 200 includes a left wheel (not shown), a left distal drive 215, a left spindle 220, an axle housing 225, a right spindle 230, a right distal drive 235, and a right wheel 240 (see FIG. 1). The axle housing 225 has an arm portion 250 on each side and a carrier housing 255 in the center between the two arms 250. The carrier housing 255 extends outward to enclose a rounded internal cavity. A carrier housing plate 260 covers the cavity on a side of the carrier housing 255 towards the center of the landfill compactor 100. The carrier housing plate 260 is attached to the carrier housing with carrier bolts 265.

Figure 3:
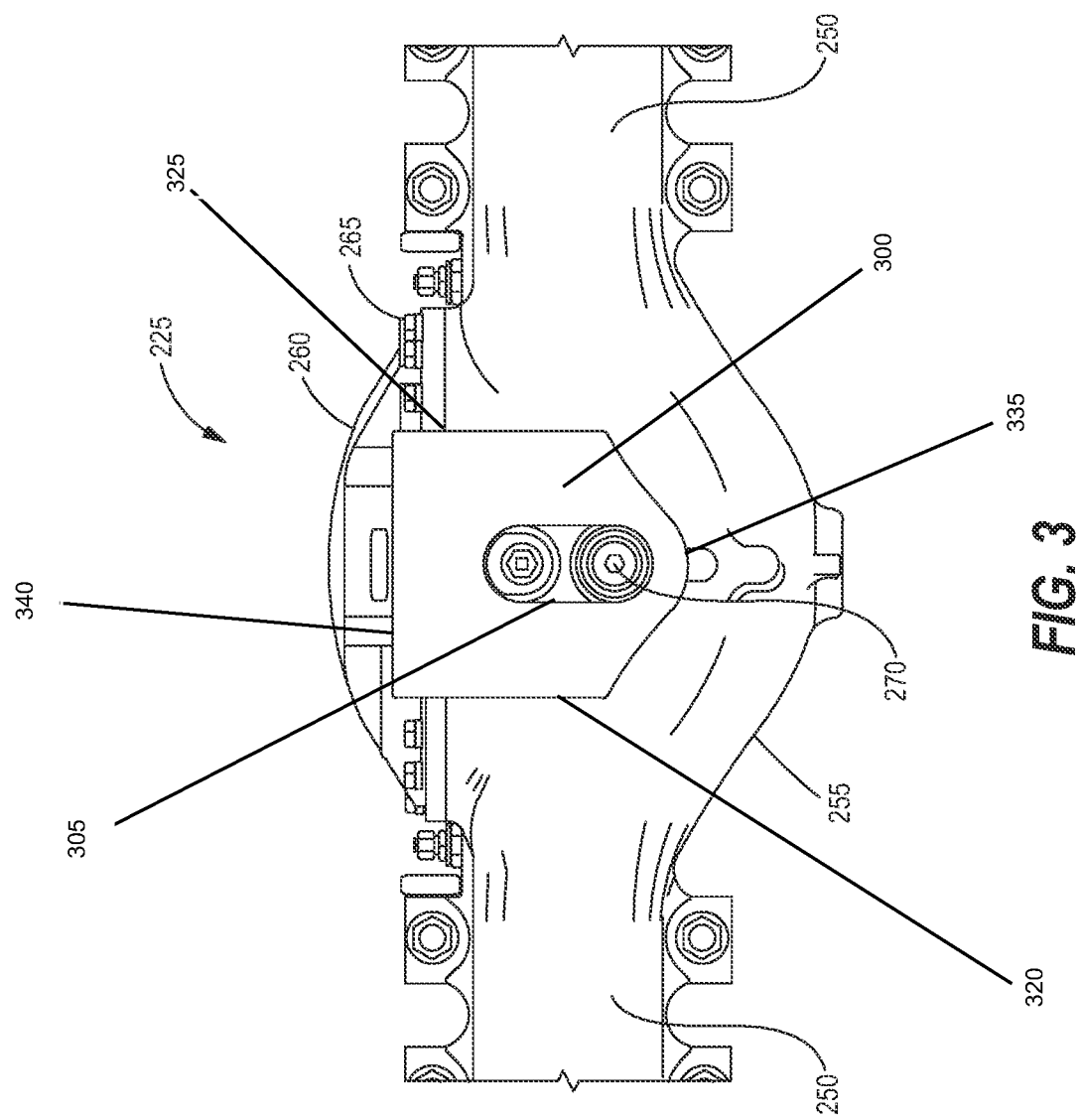
FIG. 3 is a top plan view of a portion of the axle assembly according to one embodiment of the present disclosure.

Drive train components (not shown) are housed within the axle housing 225, spindles 220, 230, and distal drives 215, 235. Some of the drive train components require a lubricant. On an underside of the carrier housing 255 is at least one drain plug 270 allowing release of the lubricant, as shown in FIG. 3. In order to strengthen the carrier housing 255 around the drain plug 260, cast ribs (not shown) may extend outwards from the carrier housing 255 around the drain plug 270. The drain plug 270 is fragile and vulnerable to wear caused by refuse coming in contact with the area as the landfill compactor 100 moves.

Figure 4:
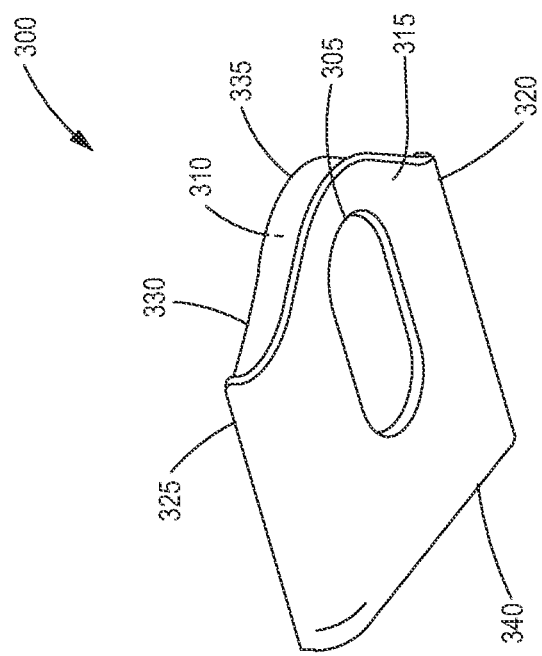
FIG. 4 is a perspective view of an axle assembly guard according to one embodiment of the present disclosure.

In order to protect the drain plug 270, a metal guard 300 is attached to the underside of the carrier housing 255, as depicted in FIG. 4. The guard 300 has a slot 305 cut through extending between a lower side 310 and an upper side 315 to allow access to the drain plug 270. The upper side 315 is configured to fit around the cast ribs and conform to the shape of the carrier housing. In the illustrated embodiment of FIG. 4, the lower side 315 is predominantly flat but curves upward toward the carrier housing 255 at a left side 320 and right side 325, corresponding to the left and right sides of the landfill compactor 100. On a front side 330 corresponding to the front of the landfill compactor 100, the guard 300 has a deflection edge 335, which projects forwards in the center and curves toward the back of the landfill compactor 100 to each side. The deflection edge 335 aids in preventing wear by pushing refuse to the sides away from the drain plug 270. The rear side 340 is flat. The guard 300 is longer from the front side 330 to the rear side 340 than from the right side 325 to the left side 320. In one embodiment, the guard 300 may be approximately 350 mm from the front side 330 to the rear side 340, 310 mm from the left side 320 to the right side 325, and 75 mm from the upper side 310 to the lower side 315. Of course, other shapes to the guard 300 are possible though not illustrated. The guard 300 may be manufactured of sheet metal or other suitable material.

The guard 300 may be attached to the axle housing 225 with an adhesive. The adhesive should be capable of adhering metal to metal. In one embodiment, the adhesive may be an acrylic adhesive. In another embodiment, the adhesive may be an epoxy. Of course, other adhesives appropriate for the use may be utilized.

INDUSTRIAL APPLICABILITY

In operation, the teachings of the present disclosure can find application in many industries. For example, the present disclosure may be employed with various construction, agricultural, and earth mover machines. When such work machines travel over rough terrain, the underside of the machine is frequently exposed to increased wear. Critical points located on the underside of the vehicle may fail prematurely as a result of this wear. This includes drain plugs in axle assembly systems. This problem is particularly severe in machines such as landfill compactors which come in contact with refuse at a higher rate than general purpose vehicles.

Figure 5:
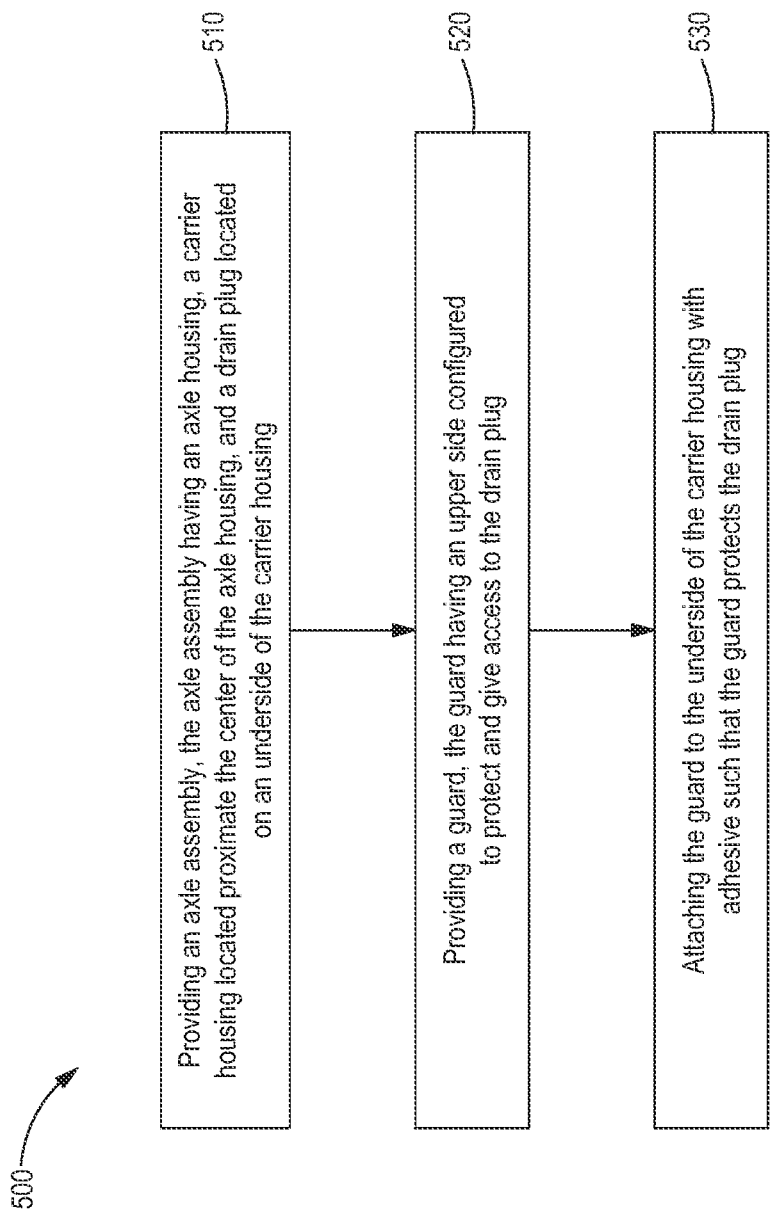
FIG. 5 is a flowchart depicting a sample sequence of steps which may be practiced in accordance with a method of the present disclosure.

In order to protect vulnerable drain plugs from exposure to refuse, a guard may be attached to the axle housing of a landfill compactor or other similar machines. The guard is configured to protect the drain plug while simultaneously permitting access. It is attached with an adhesive. As depicted in FIG. 5, the following method 500 can be practiced to protect an axle assembly drain plug with a guard. First, provide an axle assembly, the axle assembly having an axle housing, a carrier housing located proximate the center of the axle housing, and a drain plug located on an underside of the carrier housing [block 510]. Next, provide a guard, the guard having an upper side configured to protect and give access to the drain plug [block 520]. Finally, attach the guard to the underside of the carrier housing with adhesive such that the guard protects the drain plug [block 530].

While the preceding text sets forth a detailed description of numerous different embodiments, is should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. An axle assembly for a landfill compactor, comprising:
   an axle housing, comprising:
      a carrier housing located proximate a center of the axle housing; and
      first and second arm portions extending outwardly from the carrier housing;
   a drain plug located on an underside of the carrier housing; and
   a guard coupled to the carrier housing and extending over the drain plug, the guard comprising:
      a front side;
      a rear side opposite the front side;
      an upper side extending from the front side to the rear side, the upper side partially overlying the underside of the carrier housing and not extending to the first and second arms of the axle housing, the upper side including:

a central section spaced from the carrier housing;
a curved left side located proximate the carrier housing; and
a curved right side located proximate the carrier housing;
a deflection edge located at the front side and extending between the upper side and the carrier housing; and
a slot formed in the central section of the upper side and aligned with the drain plug.

2. The axle assembly of claim 1, the guard having:
a lower side, the lower side being substantially flat.

3. The axle assembly of claim 2, wherein the guard is 350 mm from the front side to the rear side, 310 mm from the left side to the right side, and 75 mm from the upper side to the lower side.

4. The axle assembly of claim 1,
wherein the deflection edge is curved to push refuse away from the drain plug and towards the left and right sides.

5. The axle assembly of claim 1, wherein the guard is glued to the carrier housing with a toughened structural acrylic adhesive.

6. A landfill compactor, comprising:
a frame;
an engine mounted on the frame;
an axle housing, comprising:
   a carrier housing located proximate a center of the axle housing; and
   first and second arm portions extending outwardly from the carrier housing;
a drain plug located on an underside of the carrier housing; and
a guard coupled to the carrier housing and extending over the drain plug, the guard comprising:
   a front side;
   a rear side opposite the front side;
   an upper side extending from the front side to the rear side, the upper side partially overlying the underside of the carrier housing and not extending to the first and second arms of the axle housing, the upper side including:
      a central section spaced from the carrier housing;
      a curved left side located proximate the carrier housing; and
      a curved right side located proximate the carrier housing;
   a deflection edge located at the front side and extending between the upper side and the carrier housing; and
   a slot formed in the central section of the upper side and aligned with the drain plug.

7. The landfill compactor of claim 6, the guard having:
a lower side, the lower side being substantially flat.

8. The landfill compactor of claim 6,
wherein the deflection edge is curved to push refuse away from the drain plug and towards the left and right sides.

9. The landfill compactor of claim 6, wherein the guard is glued to the carrier housing with a toughened structural acrylic adhesive.

10. A method for protecting an axle housing drain plug on a landfill compactor, comprising:
providing an axle assembly, the axle assembly having:
   an axle housing, comprising:
      a carrier housing located proximate a center of the axle housing; and
      first and second arm portions extending outwardly from the carrier housing; and
   a drain plug located on an underside of the carrier housing; and
attaching a guard to the underside of the carrier housing such that the guard extends over the drain plug, the guard having:
   a front side;
   a rear side opposite the front side;
   an upper side extending from the front side to the rear side, the upper side partially overlying the underside of the carrier housing and not extending to the first and second arms of the axle housing, the upper side including:
      a central section spaced from the carrier housing;
      a curved left side located proximate the carrier housing; and
      a curved right side located proximate the carrier housing;
   a deflection edge located at the front side and extending between the upper side and the carrier housing; and
   a slot formed in the central section of the upper side and aligned with the drain plug.

11. The method of claim 10, the guard having:
a lower side, the lower side being substantially flat.

12. The method of claim 11, wherein the guard is 350 mm from the front side to the rear side, 310 mm from the left side to the right side, and 75 mm from the upper side to the lower side.

13. The method of claim 10,
wherein the deflection edge is curved to push refuse away from the drain plug and towards the left and right sides.

14. The method of claim 10, wherein the guard is glued to the carrier housing with a toughened structural acrylic adhesive.

\* \* \* \* \*